(12) United States Patent
Lachwani et al.

(10) Patent No.: US 9,021,443 B1
(45) Date of Patent: Apr. 28, 2015

(54) TEST AUTOMATION API FOR HOST DEVICES

(71) Applicant: Google Inc., Mountain View, CA (US)

(72) Inventors: Manish Lachwani, Sunnyvale, CA (US); Jay Srinivasan, San Francisco, CA (US); Pratyus Patnaik, San Francisco, CA (US); Timothy D. Wang, Oakland, CA (US)

(73) Assignee: Google Inc., Mountain View, CA (US)

( * ) Notice: Subject to any disclaimer, the term of this patent is extended or adjusted under 35 U.S.C. 154(b) by 102 days.

(21) Appl. No.: 13/862,240

(22) Filed: Apr. 12, 2013

(51) Int. Cl.
*G06F 9/45* (2006.01)
*G06F 9/44* (2006.01)
*G06F 11/36* (2006.01)

(52) U.S. Cl.
CPC .................................. *G06F 11/3672* (2013.01)

(58) Field of Classification Search
CPC .................................................. G06F 11/3688
USPC ......................................... 717/124, 140, 127
See application file for complete search history.

(56) References Cited

U.S. PATENT DOCUMENTS

| | | | |
|---|---|---|---|
| 4,953,084 A | 8/1990 | Meloy et al. | |
| 6,131,188 A | 10/2000 | Goebel | |
| 6,145,122 A | 11/2000 | Miller et al. | |
| 6,151,701 A | 11/2000 | Humphreys et al. | |
| 6,598,221 B1 | 7/2003 | Pegatoquet et al. | |
| 6,829,733 B2 | 12/2004 | Richardson et al. | |
| 7,051,238 B2 | 5/2006 | Gardner et al. | |
| 7,418,697 B2 | 8/2008 | Gryko et al. | |
| 7,805,707 B2 | 9/2010 | Pouliot | |
| 7,870,540 B2 | 1/2011 | Zare et al. | |
| 7,991,747 B1 | 8/2011 | Upadhyay et al. | |
| 8,370,810 B2 | 2/2013 | Oda | |
| 8,479,166 B2 | 7/2013 | Nir-Buchbinder et al. | |
| 8,504,987 B2 | 8/2013 | Li et al. | |
| 8,671,080 B1 | 3/2014 | Upadhyay et al. | |
| 2002/0010710 A1 | 1/2002 | Binnig | |
| 2002/0040470 A1 | 4/2002 | Guthrie et al. | |
| 2002/0166081 A1 | 11/2002 | Richardson et al. | |
| 2003/0221184 A1 | 11/2003 | Gunjal et al. | |
| 2004/0194072 A1 | 9/2004 | Venter | |
| 2005/0273776 A1 | 12/2005 | Guilford | |
| 2005/0278707 A1 | 12/2005 | Guilford | |
| 2006/0059253 A1 | 3/2006 | Goodman et al. | |
| 2006/0242709 A1 | 10/2006 | Seinfeld et al. | |

(Continued)

OTHER PUBLICATIONS

Chowdhury, "Non Final Office Action dated Feb. 13, 2004", U.S. Appl. No. 13/631,919, The United States Patent and Trademark Office, Feb. 13, 2014.

(Continued)

*Primary Examiner* — Philip Wang
(74) *Attorney, Agent, or Firm* — McDonnell Boehnen Hulbert & Berghoff LLP

(57) ABSTRACT

A system is described for testing an application on one or more host devices in a host device farm using an application programming interface ("API") to send a test package containing an application to a test server. The sending may be initiated by a single action such as a click on a control in a user interface, or may be automatic such as on completion of a build. The test server may then execute and test the application across one or more host devices using one or more testing frameworks. Test results based at least in part on the type of testing framework used in the application may then be provided to a client device.

20 Claims, 7 Drawing Sheets

(56) References Cited

U.S. PATENT DOCUMENTS

| | | | |
|---|---|---|---|
| 2007/0288644 A1 | 12/2007 | Rojas et al. | |
| 2009/0150420 A1 | 6/2009 | Towner | |
| 2011/0047597 A1 | 2/2011 | Mahaffey et al. | |
| 2011/0289483 A1 | 11/2011 | Williams et al. | |
| 2012/0253745 A1* | 10/2012 | Dhanapal et al. | 702/186 |
| 2012/0260344 A1 | 10/2012 | Maor et al. | |
| 2013/0060890 A1 | 3/2013 | Lee et al. | |
| 2013/0152047 A1 | 6/2013 | Moorthi et al. | |
| 2013/0179858 A1* | 7/2013 | Mecke et al. | 717/106 |
| 2013/0185798 A1 | 7/2013 | Saunders et al. | |
| 2013/0227636 A1 | 8/2013 | Bettini et al. | |
| 2013/0276061 A1 | 10/2013 | Chebiyyam et al. | |
| 2013/0282892 A1 | 10/2013 | Levi et al. | |
| 2014/0020096 A1 | 1/2014 | Khan et al. | |
| 2014/0082729 A1 | 3/2014 | Shim et al. | |
| 2014/0237455 A1* | 8/2014 | Koneru et al. | 717/131 |

OTHER PUBLICATIONS

Charles Lu, "Debug Java applications remotely with Eclipse", developerWorks, IBM, Dec. 9, 2008, [online] [retrieved on Apr. 22, 2014] Retrieved from the Internet: <http://www.ibm.com/developerworks/library/os-eclipse-javadebug/index.html>.

Javin Paul, "How to setup Java remote debugging in Eclipse", Javarevisited-Blog about Java programming language, FIX Protocol, Tibco Rendezvous and related Java technology stack, Feb. 25, 2011, [online] [retrieved Apr. 22, 2014] Retrieved from the Internet: <http://javarevisited.blogspot.com/2011/02/how-to-setup-remote-debugging-in.html>.

Pyzocha, "Non Final Office Action dated Sep. 9, 2014", U.S. Appl. No. 13/655,667, The United States Patent and Trademark Office.

Seo, et al., "Analysis on maliciousness for mobile applications", 2012 Sixth International Conference on Innovative Mobile and Internet Services in Ubiquitous Computing, IEEE, 2012, pp. 126-129.

Bakos, et al., "Lightweight Error Correction Coding for System-Level Interconnects", IEEE Transactions on Computers, vol. 56, No. 3, Mar. 2007, pp. 1-16 [online], [retrieved on Jul. 2, 2014]. Retrieved from the Internet <URL:http://kona.ee.pitt.edu/steve/Recent%20Publications/TC_2007_TC-0414-1105-1.pdf>.

Chowdhury, "Notice of Allowance dated Jul. 2, 2014", U.S. Appl. No. 13/631,919, The United States Patent and Trademark Office.

Coyer, "Non Final Office Action dated Jun. 5, 2014", U.S. Appl. No. 13/721,632, The United States Patent and Trademark Office.

Dearle, "Software Deployment, Past, Present and Future", IEEE 2007, pp. 1-16 [online], [retrieved on Jul. 2, 2014]. Retrieved from the Internet <URL:http://www.cs.tufts.edu/comp/250SA/papers/dearle2007.pdf>.

Guglielmo, et al., "Model-Driven Design and Validation of Embedded Software", 2011 ACM, pp. 98-104 [online], [retrieved on Jul. 2, 2014]. Retrieved from the Internet <URL:http://dbonline.igroupnet.com/ACM.TOOLS/Rawdata/Acm1106/fulltext/1990000/1982616/p98-guglielmo.pdf>.

Rueher, et al., "Capturing Software Processes Through the Generated Objects", 1988, pp. 148-152 [online], [retrieved on Jul. 2, 2014]. Retrieved from the Internet <URL:http://delivery.acm.org/10.1145/80000/75138/p148-rueher.pdf>.

Pyzocha, "Non Final Office Action dated May 13, 2014", U.S. Appl. No. 13/655,667, The United States Patent and Trademark Office.

Iphonedevwiki, "debugserver", Apr. 16, 2014, available via the Internet at iphonedevwiki.net/index.php/Debugserver.

lldb.llvm.org, "The LLDB Debugger", Nov. 14, 2012, available via the Internet at lldb.llvm.org.

\* cited by examiner

TEST AUTOMATION API FOR HOST DEVICES

BACKGROUND

With the growing popularity of computing devices, there is an increasing demand for applications, or apps, to run on such devices. These devices may include smartphones, tablet computers, televisions, set-top boxes, in-vehicle computer systems, home entertainment systems, and so forth. To satisfy this demand, programmers are constantly building, testing, and maintaining applications. To ensure high quality and to identify problems, many app developers test their apps before launching them to the public. However, app testing may be time- and resource-intensive, particularly in cases where the app is to be tested on many different mobile devices running a variety of mobile operating systems of various versions under various use conditions.

Figure 1:
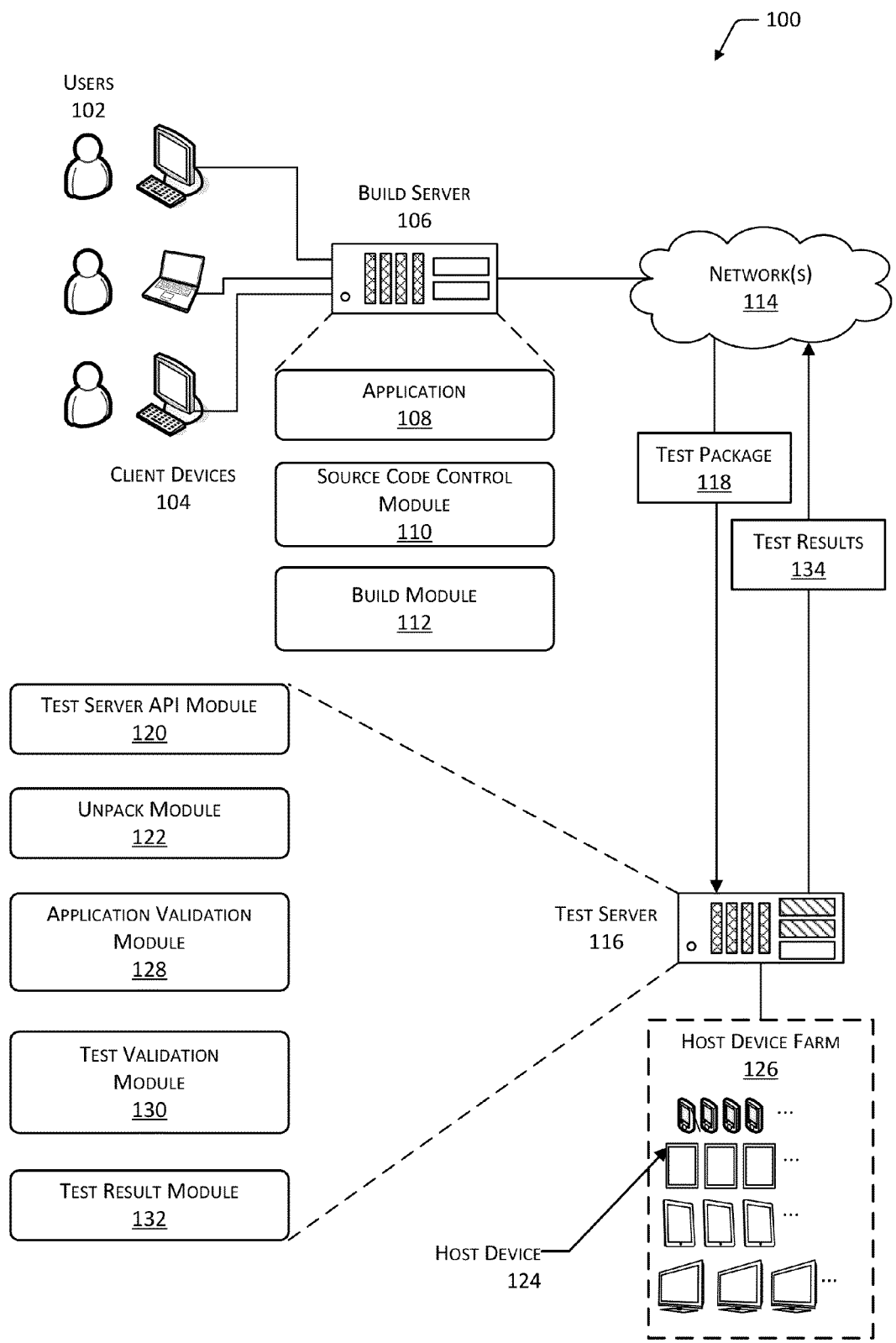
FIG. 1 depicts a system for testing an application on one or more host devices using an application programming interface ("API") across one or more test frameworks.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Overview

A wide variety of applications (or "apps") are developed for execution on computing devices including smartphones, tablet computers, televisions, set-top boxes, in-vehicle computer systems, home entertainment systems, and so forth.

There is an increasing demand for software users to build apps to run on such devices. Software users build, test, and maintain applications using a variety of development and build tools. Testing provides many benefits including finding and correcting errors, improving performance, and so forth. Testing may include observing processor usage, observing memory allocation, programmatic debugging, determining usability, validating functionality, identifying regressions, and so forth.

Continuous integration and other application development methodologies encourage frequent testing of ongoing builds of an application. For example, code for an application may be checked into a computing device such as a build server which creates a build. In some cases, the application(s) are in the form of executable binaries that have been previously generated from source code by a compiler designed to generate binary executables configured for processing by a processor of a host device. This build may then be used for ongoing development, troubleshooting, testing, and so forth. By increasing the frequency of builds of the application, problems with a build may be identified more quickly and the application development process may be improved. Traditional testing systems lack the ability to provide development tools for robust testing of applications executing on actual computing devices. There are potentially tens of thousands of different client devices that can be used to access an application. Owning and maintaining a version of each physical device with different hardware, operating system, and so forth, which may be useful for testing, can be expensive and troublesome. Additionally, code within each build of the application may be signed in order to allow the application to be tested on real devices. Code signing is the process of digitally signing executables, scripts, or other pieces of information to provide an assurance as to the identity of a software author or build system. Code signing may also be used to guarantee that the code has not been altered or corrupted after signing and may make use of one or more verification hashes. A binary which has been code signed may contain a number of verification hashes that are checked at various points during execution by a kernel. The kernel is a set of instructions which, when executed by a processor, operate as an intermediary between applications and the actual data processing done at the hardware level. Verification hashes, such as the secure hash algorithms SHA-1, SHA-2 may be used to identify revisions, data corruption or tampering, to verify digital signatures, and so forth. Code signing may be burdensome in software development environments because the code, the devices, and the operating system versions of those devices may change often.

Therefore, software users have had to rely on cumbersome methods for testing, including use of software simulators, manually provisioning and testing on computing devices connected to a particular user's desktop computer, and so forth. Simulators lack the full fidelity provided by execution on the actual computing device, resulting in incomplete testing. Manual provisioning and testing with a connected computing device is time and resource intensive and may result in the user's desktop computer being occupied with running the testing process in conjunction with the connected computing device. This disclosure describes embodiments of systems and methods for using an application programming interface ("API") to facilitate automatically testing applications using one or more actual computing devices, also known as host devices. An API is a set of routines, protocols, and tools implemented by a software program that enables the software program to interact with other programs.

A client device such as a desktop computer, laptop, and so forth may work in conjunction with a build server. The build server may be configured to support development of the application by maintaining and generating one or more builds of the application from source code ("code") provided by users or other sources. These builds may then be sent for testing.

In one implementation, when the user is ready to test the application, the user may request an access token. The access token is configured to allow a computing device such as a build server or client device to communicate with a test server. The access token may be used by the build server, the client device, or both to identify the program calling the API, and to track how the API is being used. The access token may have a set of access rights on the API associated with it. Generally, the access token is short-lived and can expire. Thus, allowing a user to communicate with the test server for a predetermined amount of time. For example, an access token may be valid up to 48 hours or any other amount of time after it has been generated. Therefore, users will need to obtain a new access token if the current access token expires. The access token may be submitted with a secure request by the user instead of submitting a username and password. Once a user has an access token, requests can be made on the user's behalf by passing the access token as part of the user's request. The access token may be generated by the test server or other computing device.

In one implementation, a user sends the application and the access token to a test server using an API. In this implementation, the transmission of API requests and responses may be made over Hypertext Transfer Protocol over Secure Socket Layer ("HTTPS") or another encrypted communication path. The test server retrieves the application and validates the type of application and the framework that will be used for testing the application.

Once the application has been retrieved, the application may be re-signed in order to permit testing and debugging. The re-signing either replaces existing digital signatures in the application or adds digital signatures to the application. This may include pseudo-signing, or generating valid hashes which allow for execution but may not otherwise meet more stringent signing requirements intended by an operating system designer. During the code signing process, entitlements may be added to the binary in the applications. Entitlements indicate how an application and features of an application may be accessed by an end user. Examples of entitlements include:

com.apple.springboard.debugapplications
get-task-allow
task_for_pid-allow
run-unsigned-code
com.apple.locationd.simulation For example, when the "get-task-allow" and "task_for_pid-allow" entitlements are set to "False", it may not possible to run tests on the application or debug the application. To overcome this issue, the application may be re-signed. In another implementation signature verification may be patched out of the kernel of the executing device, such as the host device 124. Patching out removes the signature verification functionality from the kernel, and thus permits installation of un-signed code into the application for testing and execution on the host device 124. Additionally, because the binary contains a number of verification hashes that are checked in various locations throughout the kernel, verifications hashes are generated which may then be checked and passed by the kernel.

Once the application has been re-signed, a user may also send a test package and the access token to a test server using an API. The test server receives the test package and validates that the test package corresponds to the framework that will be used for testing the application. Once the test package is verified, a user may send a list of one or more device types to be used to run the test. The test package may also include device configuration data such as, for example, network data, memory usage, device orientation, and geographic location. The test server then configures one or more host devices to execute the application according to the configuration data provided by the user. To this end, the test server may test an application across multiple frameworks using one or more host devices.

The host devices used during testing may vary from one another in hardware, software, configuration, and so forth. Additionally, the use of a plurality of host devices allows for contemporaneous testing in parallel, reducing time to provide test results compared to a sequence of serial tests on a single host device. Finally, the use of the actual computing device during testing provides the highest fidelity testing available which is representative of the end-user experience, which may improve quality of the application as released to the end user.

Once the host devices are configured, the test server may install the application on the host devices and execute the test package on each of the host devices. Alternatively, the test package may be executed by the test server that communicates with the host devices. This execution may include testing, monitoring, and so forth, configured to generate test results. The test results may include failure reports, screenshots for all of the test frameworks, logs of each of the host devices, user interface information, and any additional files that the test creates. The test results may then be returned to the build server, the client devices, or both. For example, the test results can be emailed to a user, posted to a uniform resource locator ("URL") associated with the user, real-time test results can be provided to the user via a "keepalive" process, or the results may be posted to a different URL that is maintained by a different server.

In order to expedite the overall testing process for applications across multiple frameworks and host devices, a user of a client device may easily transfer the application and the test package to the test server using an application programming interface ("API") and automatically receive test results.

Illustrated Environment

FIG. 1 depicts a system 100 for testing an application on one or more host devices using an API across one or more frameworks. One or more users 102, such as software developers, may use one or more client devices 104 coupled to a build server 106 to work with an application 108. The applications 108 may undergoing initial development, ongoing development, maintenance, and so forth.

The application 108 may be a native app, a markup language application, hybrid app, or a browser-based application. Native applications are those which are written and compiled for execution on the particular device. For example, native applications may be written in a programming language such as C++ or Objective C and compiled into native code such as a binary executable for use on the device. Markup language applications include one or more instructions in a markup language which may be rendered by a layout engine and one or more instructions in a scripting language which may be interpreted by a scripting language engine during execution. For example, a hypertext markup language ("HTML") version 5 (or greater) markup language application may include HTML, cascading style sheets ("CSS"), and JavaScript. In some implementations the markup language application may have multiple instances of the UIWebView class references. Hybrid applications include native code and markup language application portions. Browser-based applications are processed within a web browser application and are limited in execution. The browser-based applications may have only a single UIWebView instance.

The build server 106 may comprise one or more modules such as a source code control module 110, build module 112, and so forth. The source code control module 110 may be configured to provide control of source code, check-in/check-out of source code to users 102, and so forth. The build module 112 is configured to take associated source code and generate a build of the application 108. The application 108 as built comprises source code configured for execution on the host device 124. In some implementations the application 108 as built may include executable binaries, markup language applications, and so forth. In some implementations the users 102 may use the build server 106 to implement a continuous integration methodology of software development in which workspaces of the users 102 are merged frequently, such as several times per day.

The build server 106 may be configured to implement, or work in conjunction with systems implementing one or more of the Rational ClearCase family of tools from IBM Corp, the Hudson tool developed at least in part by Kohsuke Kawaguchi and available at hudson-ci.org, the Jenkins tool as forked from Hudson and promulgated by Kohsuke Kawaguchi which is available at jenkins-ci.org, Perforce from Perforce Software Inc. of Alameda, Calif., or GitHub from GitHub, Inc. of San Francisco, Calif.

The build server 106 is configured to communicate over one or more networks 114. The networks 114 may include public networks such as the Internet, private networks such as an institutional and/or personal intranet, or some combination of private and public networks. The networks 114 may also include any type of wired and/or wireless network, including but not limited to local area networks (LANs), wide area networks (WANs), Wi-Fi, WiMax, and mobile communications networks (e.g. 3G, 4G, and so forth). The networks 114 may utilize communications protocols, including packet-based and/or datagram-based protocols such as internet protocol (IP), transmission control protocol (TCP), user datagram protocol (UDP), or other types of protocols.

A test server 116 may also communicate over one or more networks 114. Communication may be established between the build server 106 and the test server 116. The build server 106 is configured to generate and send an application 108 and a test package 118 along with an access token to the test server 116. The test package 118 may comprise tests, configuration data, build information, and so forth. The build server 106 may send the application 108 and test package 118 using a uniform resource locator ("URL") which is associated with a particular account on the test server 116. The URL used by the build server 106 to send the test package 118 may be unique to a particular user 102, group of users 102, build server 106, entity, organization, and so forth. Alternatively, the build server 106 may indicate a raw file path corresponding to the location of the application 108 and the test package 118 on a client device 104.

The test server 116 comprises a test server API module 120 configured to accept and respond to the application 108 and the test package 118 sent by the build server 106. In one implementation, the exchange of information between the build server 106 and the test server 116 may be encrypted. For example, transfers of the application 108 and the test package 118 may use HTTPS.

As described above, the build server 106 may be configured to implement, or work in conjunction with, various systems to support development. In one implementation the build server 106 may implement a Hudson/Jenkins build server system with plugins configured to interface with the test server 116 using the test server API module 120. The plugins may allow for opening a specific host device 124 with an installed specific build of the application 108 as a post build option. The plugins may also allow for automated calls to the test server 116 to interact with particular builds.

In some implementations the test server 116 may be configured to work with various tools such as ClearCase, Jenkins, Hudson, Perforce, GitHub, and so forth. Similarly, the test server 116 and the services provided by the test server 116 may be configured to integrate with various software development kits ("SDKs"). For example, integration may be provided for SDKs promulgated by Sencha Inc. of Redwood City, Calif., PhoneGap by Adobe Systems of San Jose, Calif., AppGyver by AppGyver Inc. of San Francisco, Calif., Eclipse by the Eclipse Foundation of Ottawa, Ontario, and so forth. The test server 116, or portions thereof such as the test server API module 120, may be customized to allow for integration with particular users 102 or entities.

An unpack module 122 may be configured to unpack the test package 118. This unpacking may include one or more of separating out the executables, tests, configuration data, build information, and so forth.

The host devices 124 may include smartphones, tablet computers, televisions, set-top boxes, in-vehicle computer systems, home entertainment systems, and so forth. The host device farm 126 may include different varieties of host devices 124. These varieties may reflect differences in hardware, software, configuration, and so forth. For example, the host device farm 126 may include host devices 124 from manufacturer "A", manufacturer "B", and so forth. Furthermore, these host devices 124 may be of different generations, capabilities, and so forth. Continuing the example, the host devices 124 from the manufacturer "A" may include tablet computers, smartphones, and so forth.

In some embodiments, the test server 116 may employ one or more input/output ("I/O") interfaces comprising an electrical or optical connection to couple to the one or more host devices 124 in the host device farm 126. In one embodiment, a universal serial bus ("USB") 2.0 or better connection may be used to communicatively couple the host device 124 to the test server 116. The USB connection may be used to transfer data from the host device 124 to the test server 116 or another test server 116, using TCP as a communication protocol. The data may include the application 108, testing applications, screenshots, test results, diagnostic data, and so forth.

The test server 116 may also be configured to receive information associated with all the test frameworks associated with the one or more host devices 124. This information may include diagnostic output, testing outputs, screenshots of one or more of the displays of the one or more host devices 124, and so forth. The screenshots may be stored as still images, or combined to form a video stream representative of information presented on the display of the host device 124. The screenshots generated as the one or more host devices 124 execute the application 108 may be received by the test server 116 for analysis, presentation to the user 102, stored, and so forth.

An application validation module 128 may also be provided in the test server 116. The application validation module 128 may be executed to validate and verify that the application 108 meets design and development requirements.

Additional details on the application validation module 128 may be found in U.S. patent application Ser. No. 13/631,919, filed on Sep. 29, 2012, titled "Application Validation Through Object Level Hierarchy Analysis" to Manish Lachwani, et al. which is incorporated by reference into this disclosure.

The test server 116 may also incorporate a test validation module 130. The test validation module 130 may be executed to validate and verify that test package 118 is a valid file type for the particular framework that is used for testing the application 108.

A test result module 132 is configured to generate test results 134 based at least in part on information provided by one or more of the host devices 124. The test server API module 120 may be used to provide the test results 134 to the build server 106, the client devices 104, or both. In one implementation, a user 102 may specify the information that is captured and provided in the test results 134.

The build server 106, a client device 104, or both may receive the test results 134. The build server 106 may provide at least a portion of the test results 134, or information based at least in part on the test results 134, to the client devices 104 for presentation to the users 102. In some implementations the build module 112 may use information in the test results 134 to indicate portions of the application 108 which have passed or failed testing by the test server 116. The user 102 may also specify how the test results 134 are to be presented to the user 102. For example, at least a portion of the test results 134 may be emailed to an email address provided by a user 102, posted to the URL specified by a user 102, sent to a client device as the test results 134 are generated using a "keepalive" process, or posted to URL associated with an owner of the test server 116. In some instances, test results 134 that are posted to the URL associated with the owner of the test server 116 may be available for viewing by a user 102 for a predetermined amount of time.

The modules of the build server 106, the test server 116, the host devices 124, and so forth are described in this disclosure as separate modules. In some implementations at least a portion of the functionality of these modules may be combined into a single module, or incorporated into another module. Furthermore, in some implementations the build server 106, the test server 116, and the host device farm 126 may be operated within an organization, particular network, and so forth. For example, a software development company may choose to implement the system 100 for their internal use only.

Figure 2:
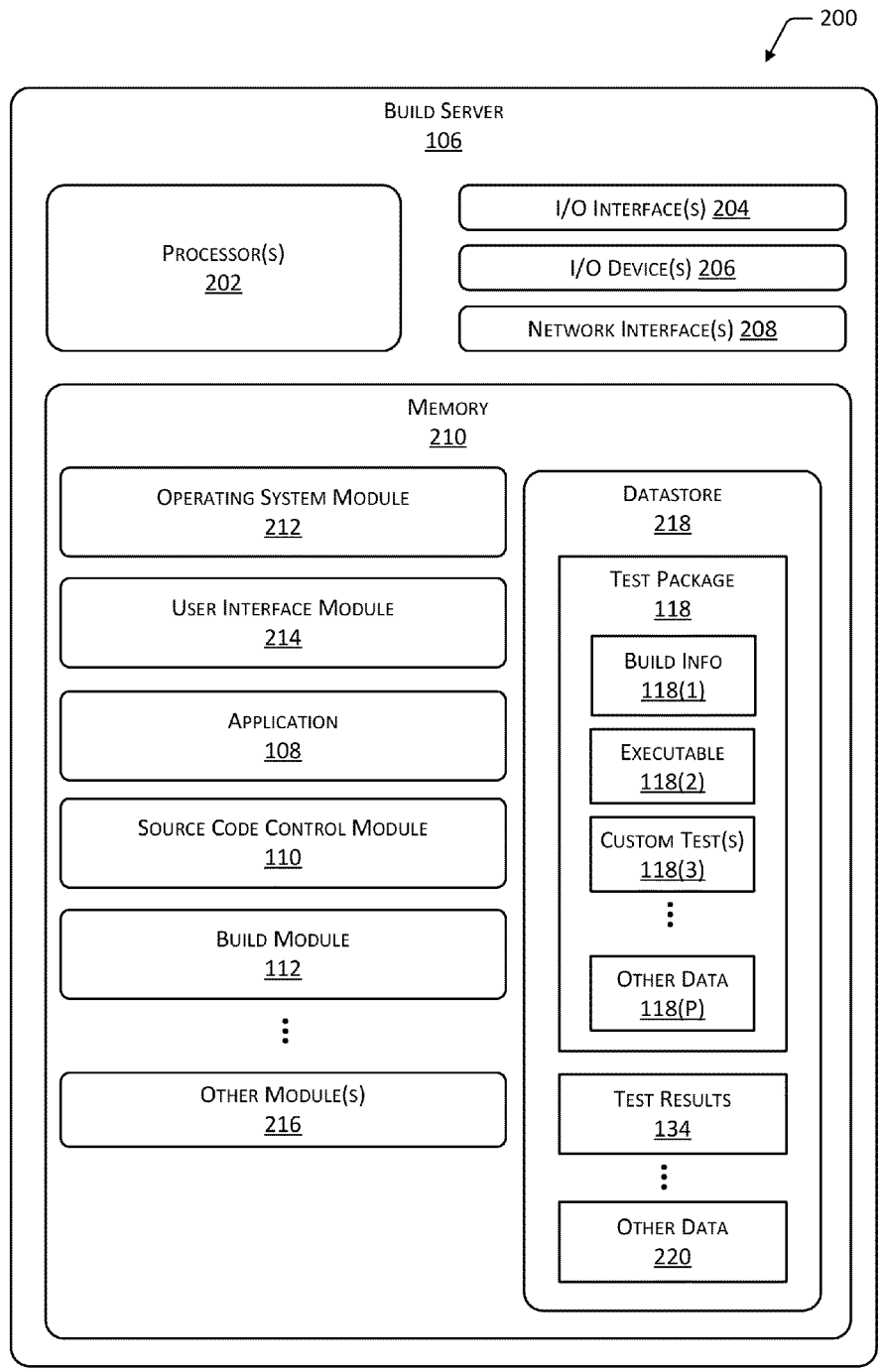
FIG. 2 depicts a block diagram of a build server configured to facilitate development of the application by sending applications for testing using an API.

FIG. 2 depicts a block diagram 200 of the build server 106 configured to facilitate development of the application by sending applications for testing using an API. The build server 106 may include one or more processors 202 configured to execute one or more stored instructions. The processors 202 may comprise one or more cores.

The build server 106 may include one or more input/output (I/O) interface(s) 204 to allow the build server 106 to communicate with other devices. The I/O interface(s) 204 may couple to one or more I/O devices 206. In some embodiments, the I/O device(s) 206 may be physically incorporated with the build server 106 or be externally placed.

The build server 106 may also include one or more network interfaces 208 to enable communications between the build server 106 and other networked devices. Such network interface(s) 208 may include one or more network interface controllers (NICs) or other types of transceiver devices configured to send and receive communications over the network(s) 114. For example, the network interface(s) 208 may be configured to provide a Wi-Fi connection compliant with one or more IEEE 802.11 standards such as 802.11g or 802.11n. The build server 106 may also include one or more busses or other internal communications hardware or software that allow for the transfer of data between the various modules and components of the build server 106.

The build server 106 includes one or more memories 210. The memory 210 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 210 provides storage of computer readable instructions, data structures, program modules, and other data for the operation of the build server 106.

The memory 210 may include at least one operating system (OS) module 212. The OS module 212 is configured to manage hardware resources such as the I/O interface(s) 204 and network interface(s) 208, and to provide various services to applications or modules executing on the processor(s) 202.

The memory 210 may include a user interface module 214, the application 108, the source code control module 110, the build module 112, or other module(s) 216. The user interface module 214 is configured to provide a user interface to the one or more client devices 104. In some implementations the user interface may comprise a graphical user interface, and may be delivered as hypertext markup language ("HTML") data configured for presentation on the client devices 104.

In some implementations the functionality of the build server 106 may exist across one or more devices. For example, a first build server 106(1) may provide the user interface module 214 while a second build server 106(2) provides the source code control module 110, a third server 106(3) provides the build module 112, and so forth.

The memory 210 may also include a datastore 218 to store information for operations of the build server 106. The datastore 218 may comprise a database, array, structured list, tree, or other data structure. In some implementations, the datastore 218 may store the test package 118 before transmission to the test server 116, the test results 134 received from the test server 116, and so forth.

The test package 118 may include information including build information 118(1), executable files 118(2), custom tests 118(3), or other data 118(P) such as testing configuration data. The build information 118(1) may provide information indicative of libraries used, host devices 124 supported, build version number information, and so forth for a particular application build. For example, the build information 118(1) may indicate that the test package 118 includes build 5.13.1030.1 which is configured for execution on a particular computing device model from manufacturer "A". The executable files 118(2) may include executable binaries, markup language applications, and so forth, which are configured for execution on the host devices 124.

The custom tests 118(3) comprise information indicative of tests, test scripts, designation portions of the application 108 to test, and so forth. For example, the user 102 may generate a custom test 118(3) to exercise particular functionality of the application 108. These custom tests 118(3) may comprise unit tests configured for use on the host devices 124 in the host device farm 126. For example, the custom tests 118(3) may include those developed in the OCUnit testing framework promulgated by sente.ch from Sen:te of Switzerland, Calabash as promulgated by lesspainful.com of Denmark, Frank as promulgated by testingwithfrank.com as associated with ThoughtWorks Inc. of Chicago, Ill. The test package 118 may include other data 118(P) such as user identification, account information, and so forth.

Other data 220 may also be stored, such as the API URL associated with the test server 116, historical test results, version information, code check-in/check-out information, build status, and so forth. To this end, the datastore 218 may be configured to store and maintain information relating to the testing of the application 108 including test success rates, as well as, failure reports augmented with context screenshots to pinpoint causes and activities at various crash times.

Figure 3:
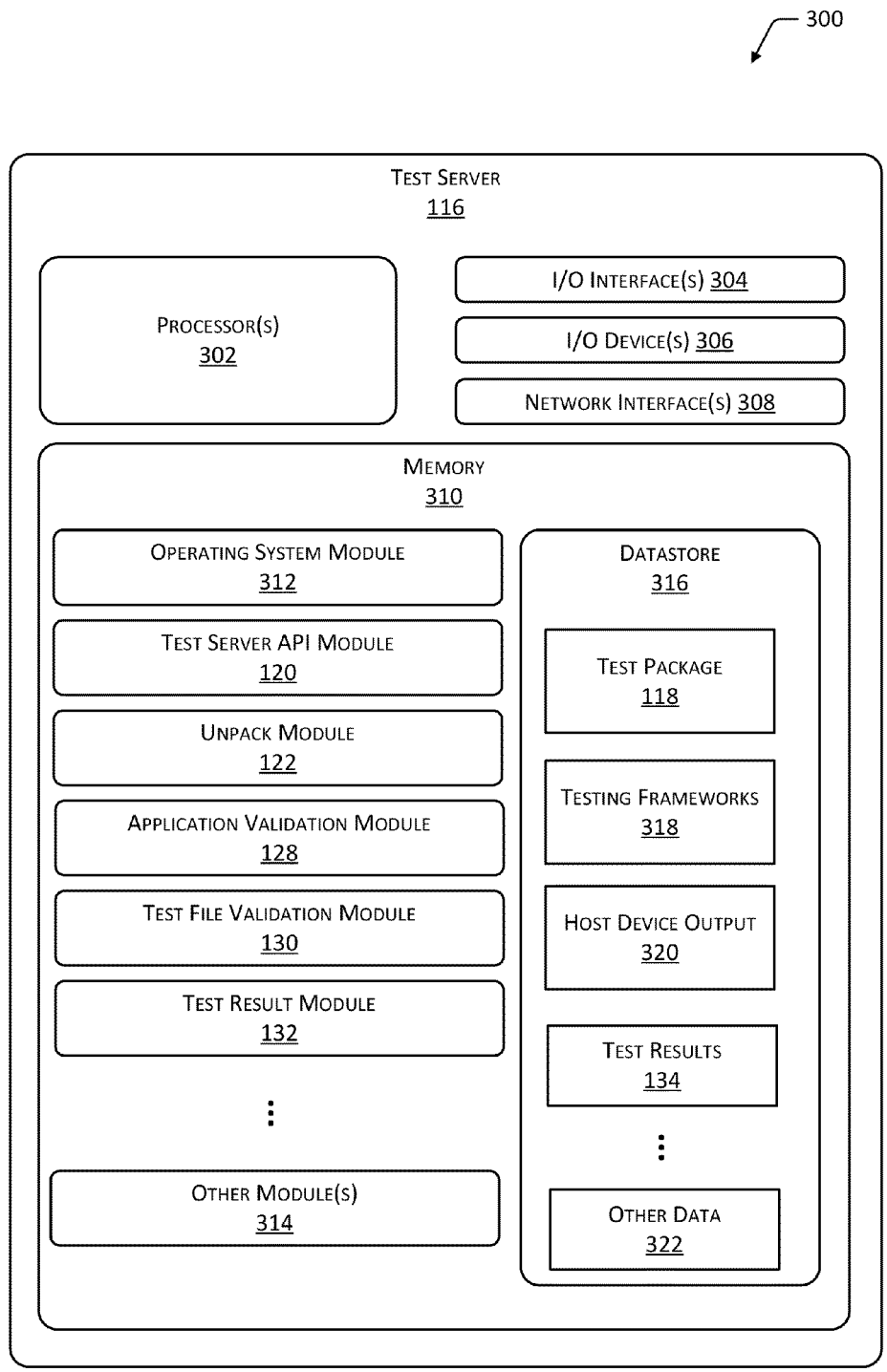
FIG. 3 depicts a block diagram of the test server configured to receive the application for test using the API and test the application on one or more host devices.

FIG. 3 depicts a block diagram 300 of the test server 116 configured to receive the application for test using the API and test the application using one or more host devices. The test server 116 may include one or more processors 302 configured to execute one or more stored instructions. The processors 302 may comprise one or more cores.

The test server 116 may include one or more I/O interface(s) 304 to allow the test server 116 to communicate with other devices. For example, the I/O interface(s) 304 may be configured to provide a universal serial bus (USB) connection to couple to the host device 124. The I/O interfaces 304 may also be known as "communication interfaces."

The I/O interface(s) 304 may couple to one or more I/O devices 306, such as described above. In some embodiments, the I/O device(s) 306 may be physically incorporated with the test server 116 or be externally placed.

The test server 116 may also include one or more network interfaces 308 to enable communications between the test server 116 and other networked devices such as those depicted in FIG. 1. Such network interface(s) 308 may include one or more NICs or other types of transceiver devices configured to send and receive communications over the network(s). For example, the network interface(s) 308 may be configured to provide a Wi-Fi connection compliant with one or more IEEE 802.11 standards such as 802.11g or 802.11n. The test server 116 may also include one or more busses or other internal communications hardware or software that allow for the transfer of data between the various modules and components of the test server 116.

The test server 116 may include one or more memories 310. The memory 310 comprises one or more CRSM as described above. The memory 310 provides storage of computer readable instructions, data structures, program modules, and other data for the operation of the test server 116.

The memory 310 may include at least one OS module 312. The OS module 312 is configured to manage hardware resources such as the I/O interface(s) 304 and network interface(s) 308, and to provide various services to applications or modules executing on the processor(s) 302.

The memory 310 may store one or more of the test server API module 120, the unpack module 122, the application validation module 128, the test validation module 130, the test result module 132, and so forth.

The test server API module 120 is configured to accept and respond to the test package 118 or other information sent by the client device 104, the build server 106, or both. The test server API module 120 may also be configured to send the test results 134 or other information to the client device 104, build server 106, or both. Use of the test server API module 120 allows the client device 104 and the build server 106 to integrate the testing functionality of the test server 116 into the automated or semi-automated testing processes associated with the application build.

The unpack module 122 may be configured to unpack the test package 118. The unpacking may include one or more of separating out the application build, tests, configuration data, build information, and so forth.

The memory 310 may also include the application validation module 128 configured to validate and verify that the application 108 meets design and development requirements. The memory 310 may also incorporate a test file validation module 130. The test file validation module 130 may be configured to validate and verify that test package 118 is a valid file type for the particular framework that is used for testing the application 108. The test result module 132 is configured to generate test results 134 based at least in part on information provided by one or more of the host devices 124. Other modules 314 may also be stored in the memory 310.

The memory 310 may also include a datastore 316 to store information for operations of the test server 116. The datastore 316 may comprise a database, array, structured list, tree, or other data structure.

The datastore 316 may also include the test package 118 as received from the client device 104 or the build server 106 using the test server API module 120. Testing frameworks 318 may also be stored in the datastore 316. Examples of various frameworks include OCUnit, UIAutomation, KIF, Calabash, Frank, and so forth. These testing frameworks enable users to create tests that automate tasks of testing functionality of the application 108 on one or more host devices 124. Host device output 320 may also be stored. The host device output 320 comprises information received from the host devices 124 in the host device farm 126. The host device output 320 is discussed in more detail below with regard to FIG. 4.

The test results 134 may also be stored in the datastore 316, along with other data 322. The other data 322 may include account information, billing preferences, test configurations, and so forth. The test results 134 may include failure reports, screenshots for all of the test frameworks, logs of each of the host devices, user interface information, and any additional files that the test creates. Additionally, the test results 134 may include information related to anomalous occurrences during testing of the application 108 that have occurred by various causes, other than by defects or bugs in the application 108. In order to follow up the causes of the failures, detailed information on operating environments, statuses of the system in use, and so forth may also be included in the test results 134.

Figure 4:
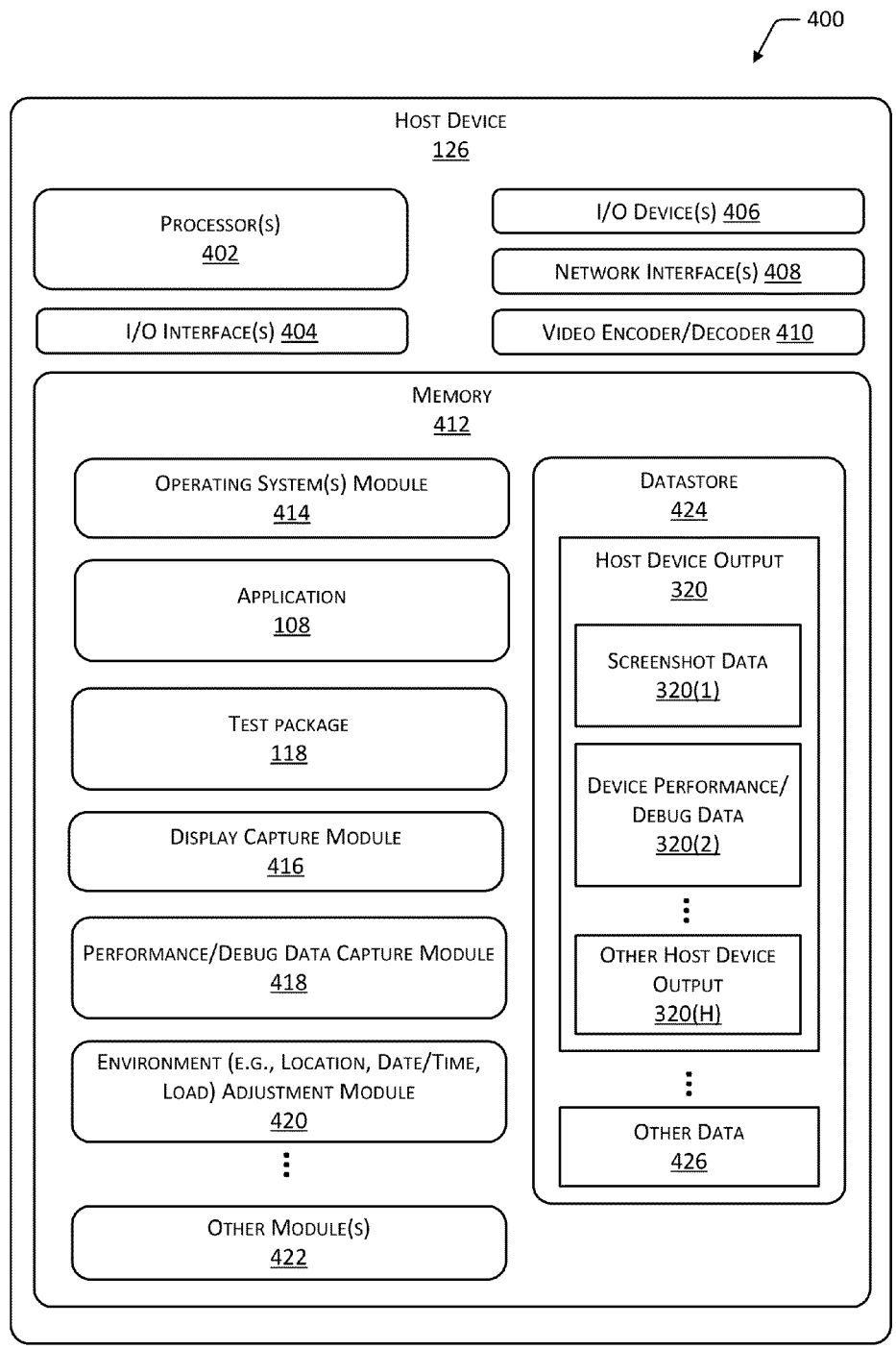
FIG. 4 depicts a block diagram of the host device controlled by the test server.

FIG. 4 depicts a block diagram 400 of the host device 124. As described above, the host device farm 126 may be made up of one or more host devices 124 which may be used to test the application 108. The host device 124 may include one or more processors 402 configured to execute one or more stored instructions. The processors 402 may comprise one or more cores.

Similar to the devices described above, the host device 124 may include one or more I/O interface(s) 404 to allow the host device 124 to communicate with other devices. The I/O interface 404 may be configured to provide a USB connection.

The I/O interface 404 may couple to one or more I/O devices 406. The I/O devices 406 may include user input devices such as one or more of a keyboard, a mouse, a pen, a game controller, a voice input device, a touch input device, gestural input device, and so forth. The I/O devices 406 may include output devices such as one or more of a display, a printer, audio speakers, haptic output device, and so forth. In some embodiments, the I/O devices 406 may be physically incorporated with the host device 124 or be externally placed.

The host device 124 may also include one or more network interfaces 408 configured to send and receive communications over the one or more networks 114. The host device 124 may also include one or more busses or other internal communications hardware or software that allow for the transfer of data between the various modules and components of the host device 124.

The host device 124 may include a hardware-based video encoder/decoder 410. While a hardware-based video encoder/decoder is described, in some implementations a hardware-based video encoder may be used. The video encoder/decoder 410 may be incorporated into a common die with the one or more processors 402 or may be on a separate die. The video encoder/decoder 410 may be configured to enable the capture of screenshot data in the H.264 or MPEG-4 Part 10 compliant format.

The host device 124 includes one or more memories 412. The memory 412 comprises one or more CRSM, as described above. The memory 412 may include at least one operating system ("OS") module 414. The OS module 414 is configured to manage hardware resources such as the I/O interfaces 404 and provide various services to applications or modules executing on the one or more processors 402. The OS module 414 may comprise mobile operating systems configured for execution on mobile computing devices. The operating systems module 414 may implement one or more of iOS® from Apple Corp. of Cupertino, Calif.; Windows Mobile® from Microsoft Corp. of Redmond, Wash.; Android® from Google, Corp. of Mountain View, Calif. and its derivatives from various sources; Palm OS® from Palm Computing, Inc. of Sunnyvale, Calif. and its derivatives from various sources; BlackBerry OS® from Research In Motion Ltd. of Waterloo, Ontario, Canada; or other operating systems such as VxWorks from Wind River Systems of Alameda, Calif.

The memory 412 may also include one or more of the application 108, the test package 118, a display capture module 416, a performance/debug data capture module 418, an environment adjustment module 420, or other modules 422.

The application 108 is configured to execute on the host device 124. For example, this may be the application 108 received from the client device 104 or the build server 106.

In some cases, the test package 118 may reside on the host device 124. In such cases, the testing framework 318 may be inserted into the application 108 at runtime.

The display capture module 416 is configured to capture screenshots of the host device 124 display and generate screenshot data 320(1). The screenshot data 320(1) may be generated using the hardware-based video encoder/decoder 410. Use of the hardware-based video encoder/decoder 410 allows for the high-fidelity capture and presentation of images presented on the display of the host device 124. This high-fidelity is based on the ability to capture the screenshots at the full resolution and at the full frame rate or redraw rate of the display.

The performance/debug data capture module 418 is configured to capture one or more of: performance data about the host device 124, code-level debug data for apps or other processes running on the host device 124, and so forth. The information may be provided to the build server 106, the user 102, or both.

The environment adjustment module 420 is configured to adjust the host device 124 environment based on input from the test server 116. The environment includes OS, OS version, firmware, firmware version, language in use, date, time, location/position, orientation, and so forth.

The environment adjustment module 420 may modify the location of the host device 124 such that processes running on the host device 124 behave as though the host device were located in a location other than its actual, physical location. For example, the host device 124 may be located in a test facility in San Francisco, Calif., but the OS module 414 of the host device 124 or other applications may report a location of London, England.

The environment adjustment module 420 may also generate loads on the one or more processors 402, memory 412, I/O devices 406, or a combination thereof. For example, the environment adjustment module 420 may be configured to execute an application 108 which consumes 50% of the processor 402 resources and uses enough memory 412 to result in a low-memory state in the OS module 414. The application 108 may then be executed, and tested under these loaded conditions.

The other modules 422 may also be included in the host device 124. These other modules 422 may include, but are not limited to, other application modules not under test.

The memory 412 also includes a datastore 424 to store information for operations of host device 124. The datastore 424 may comprise a database, array, structured list, tree, or other data structure. The datastore 424 may store the host device output 320, which may comprise the screenshot data 320(1) generated by the display capture module 416. The screenshot data 320(1) may be stored until such data is retrieved from the host device 124 by the test server 116 or overwritten by the display capture module 416. The host device output 320 may also include device performance and/or debug data 320(2) gathered by performance/debug data capture module 418. As above, the data 320(2) may be stored until retrieved by the test server 116. Other host device output 320(H) may also be stored. Other data 426 may also be stored in the datastore 424.

Figure 5:
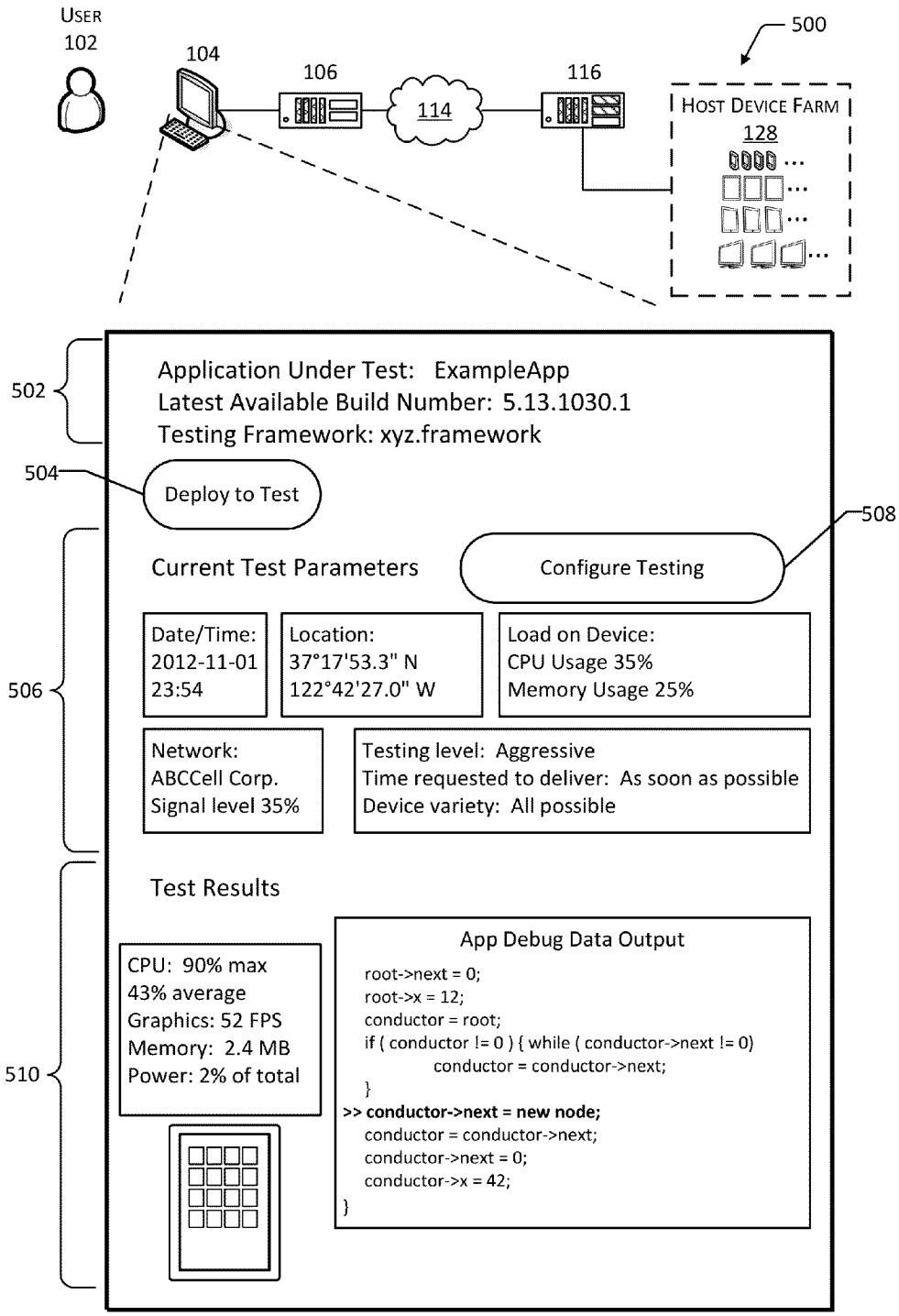
FIG. 5 depicts a user interface of testing options and results which may be presented to a user.

FIG. 5 depicts a user interface 500 of testing options and results which may be presented to the user 102. The interface 500 may comprise a web interface suitable for viewing within a web browser running on the client device 104 of the user 102. In some implementations, the data provided by the interface 500 may be copied into a file and reported to a user 102 in the file, in an email, or through other means. The data provided by the interface 500 may be stored in a file or other data format or structure, and provided to the user 102 or to a process in response to a request.

The interface 500 may include a summary section 502, describing characteristics of the application build. For example, as shown here it may indicate the name of the application 108 "ExampleApp", the current build number "5.13.1030.1", and the testing framework "xyz.framework". In this example, the application 108 is configured to use the XYZ framework.

A deploy-to-test control 504 may be presented. The control 504 is configured to, on activation, generate and send the test package 118 using the API 120 to the test server 116 for testing without further intervention by the user 102. The API 120 may plug into the existing code repositories associated with the application 108 and build systems. In some implementations the generation and sending of the test package 118 may be initiated automatically, such as at a pre-determined time, upon check-in of all portions of the application 108, upon completion of a process, and so forth A current test parameter section 506 provides information about the current configuration of the tests to be completed. For example, the test parameters may specify particular date and time, geographic location, CPU loading and memory usage to be used during testing, network, orientation, and so forth. For example, as shown here the wireless wide area network is set to provide an environment representative of service from "ABCCell Corp." with a signal level as received at the host device 124 of 35%.

The current test parameter section 506 may also provide information such as what tests are to be run, time frame to provide results, how to apply those tests, and so forth. For example, as shown here the testing level is set to "aggressive" in which all available tests will be scheduled to run against the application 108. The user 102 may specify a time requested to deliver, such as "as soon as possible," "reduced cost," and so forth. For example, the "as soon as possible" may prioritize and conduct tests for the application 108 ahead of other applications which have selected the "reduced cost" option. The "reduced cost" option may thus be offered at a lower cost relative to the "as soon as possible" option given the potential delay in providing the test results 134. Host device 124 variety may also be specified, enabling the application 108 to be tested against all available devices compatible with the application 108, against a certain model, and so forth. This allows for testing to be conducted easily and quickly with several models of the host device 124. For example, the host device farm 126 may include legacy host devices 124 which are no longer available for purchase, or pre-release models of a next-generation host device 124 to allow for advance testing.

A configure testing control 508 may be presented. The configure testing control 508 is configured to, on activation, provide for modification of one or more of the test parameters. In one implementation, activation of the configure testing control 508 may present a user interface allowing the user 102 to change the test parameters. For example, the user 102 may select options to enable debug options which provide details on UIView.

A test results section 510 provides information based at least in part on the test results 134 as received from the test server 116. The information may include screenshot data 320(1), device performance/debut data 320(2), and so forth. For example, the user 102 may watch a stream of video taken during a portion of the testing of the application 108 on the one or more host devices 124 to observe behavior during testing. Other information such as UIView details, a portion of a UI layout hierarchy dump, application load times, web site load times, and so forth may also be presented. The output of the test results 134 may be configurable to meet the specific requirements of particular users 102. For example, test results 134 may be filtered based at least in part on device type prior to being presented to a user 102.

Figure 6:
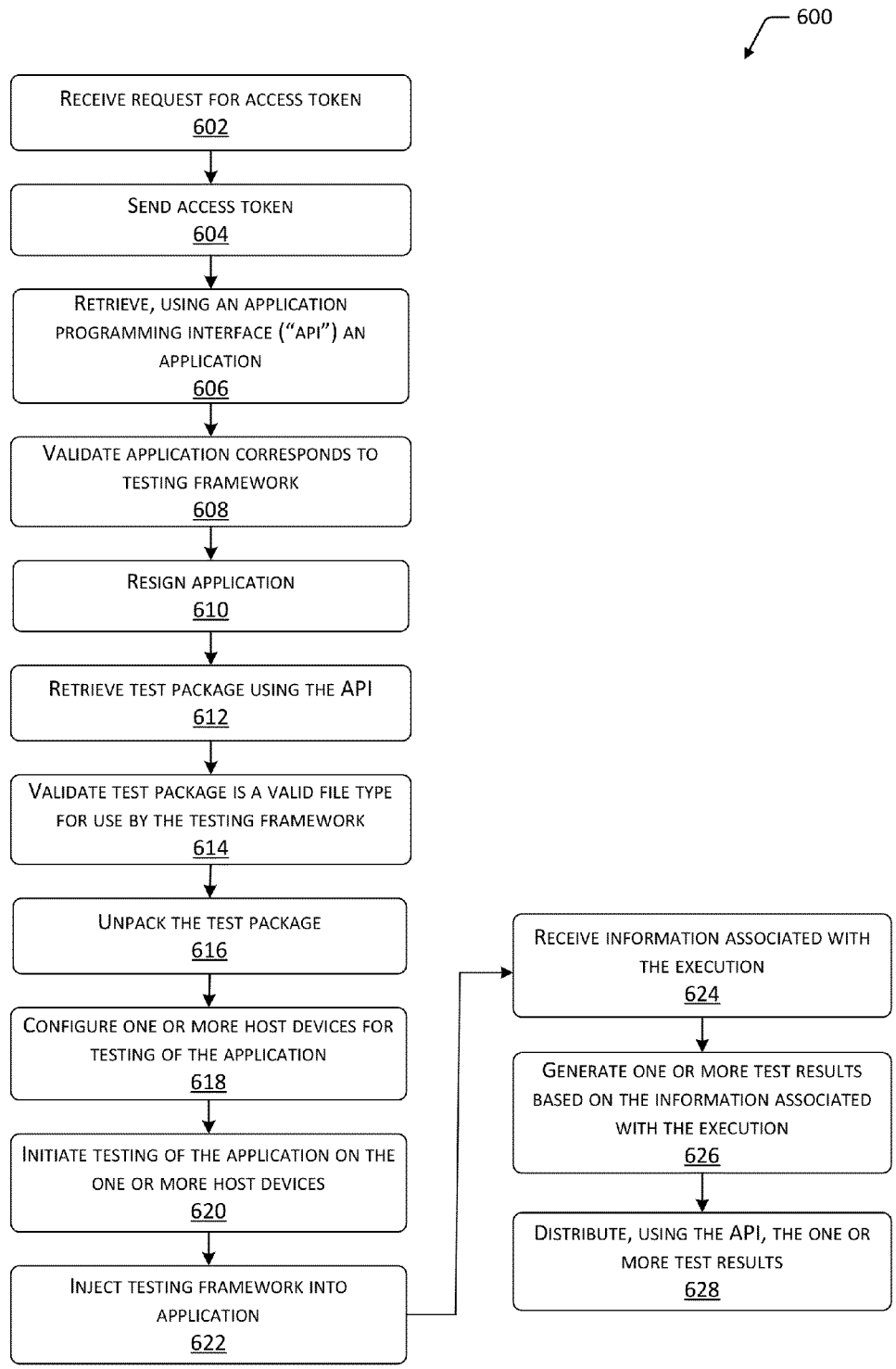
FIG. 6 depicts a flow diagram of a process on the test server to receive the application using the API and test the application on the one or more host devices using one or more testing frameworks.

FIG. 6 depicts a flow diagram 600 of a process on the test server 116, to receive the application 108 using the API and to test the application 108 on the one or more host devices 124 across one or more testing frameworks and generate test results 134. In some implementations this process may be distributed across a plurality of servers or other devices.

At block 602, the test server 116 receives a request for an access token that facilitates communication between the client device 104 or the build server 106 and the test server 116. The access token may be used by the build server 106, the client device 104, or both to identify the program calling the API, and to track how the API is being used. The access token may have a set of access rights on the API associated with it.

At block 604, the test server 116 sends the access token to the client device 104, the build server 106, or both. In one implementation, at least a portion of the access token may be generated, transmitted, or received a third-party computing device. The access token may be submitted with a secure request by the user 102 instead of submitting a username and password. Once a user 102 has an access token, requests can be made on the user's 102 behalf by passing the access token as part of the user's 102 request.

At block 606, the test server 116 retrieves the application 108 using the API 120 and at block 608 the test server 116 validates the type of application 108 and the testing framework 318 that will be used for testing the application 108. For example, Calabash provides for functional testing of iPhone and iPad apps. To use Calabash, the application 108 must be linked to the Calabash framework. Using this example, the test server 116 verifies that the application 108 is linked with the "calabash.framework".

At block 610, the application 108 is re-signed. As described above, the code signing process may involve providing entitlements. In one implementation, entitlements are provided to turn on "get-task-allow" and "task_for_pid-allow" to enable the application 108 for testing and debugging. For example, the following sample code may be used to provide entitlements:

Sample Code 1

```
# DumpEntitlements<ARM binary>
# Create an entitlements file of the format:
<!DOCTYPE plist PUBLIC "-//Apple//DTD PLIST 1.0//EN"
"http://www.apple.com/DTDs/PropertyList-1.0.dtd">
<plist version="1.0">
<dict>
    <key>com.apple.springboard.debugapplications</key>
    <true/>
    <key>get-task-allow</key>
    <true/>
    <key>task_for_pid-allow</key>
    <true/>
    <key>run-unsigned-code</key>
    <true/>
    <key>com.apple.locationd.simulation</key>
    <true/>
</dict>
</plist>
```

After the entitlements have been provided, the application 108 can be signed using these entitlements by using: "#SignEntitlement<ARM binary>".

At block 612, the test server 116 retrieves the test package 118. As described above, the test package 118 may comprise the build information 118(1), one or more executable files 118(2), custom tests 118(3), testing configuration data, and so forth.

At block 614, the test server 116 validates and verifies that test package 118 is a valid file type for the particular testing framework 318 that is used for testing the application 108.

At block 616, the test server 116 unpacks the test package 118. For example, the test server 116 may extract and separate the build information 118(1), the executable files 118(2), and so forth for processing. This unpacking may include one or more of separating out the executables, tests, configuration data, build information, and so forth.

In some implementations, the unpacking may be based at least in part on the URL which was used to transfer the test package 118. For example, a particular URL may be associated with tests configured for a particular entity, or group within the entity. As described above, the test server 116 may use the I/O interface 304, such as the USB interface, to exchange information with the host device 124.

At block 618, the test server 116 then configures one or more host devices 124 to execute the application 108 according to the configuration data provided by the user 102. Each of the host devices 124 may be configured according to the network parameter, orientation parameter, geographic location parameter, memory parameter, and other test conditions.

At block 620, the test server 116 initiates testing of the application 108 on one or more of the host devices 124 in the host device farm 126. The test server 116 may install the application 108 on the host devices 124 and execute the test package 118 on each of the host devices 124. In implementations involving iOS® devices, the application 108 may be installed by communicating with the mobile_installation_proxy executing on an iOS® device. In implementations involving Android® or other operating systems, the application 108 may be installed using a command line utility.

Alternatively, the test package 118 may be executed by the test server 116 that communicates with the host devices 124. As described above, the one or more tests may be executed contemporaneously across a plurality of the one or more host devices 124. For example, one-hundred different tests may be executed simultaneously on one-hundred different host devices 124.

In one implementation, a test script within a test package 118 may access an API between tests. Local APIs to the host devices 124 may be invoked during or between test runs. These local APIs may support one or more of the following calls: setLocation, setOrientation, setNetworkCondition, multiTouch, gestures, Rotation, setDeviceMemory, clickAndSwitchApp, or switchApp. These calls are configured to modify operation of the host device 124, regardless of sensor input. The setLocation call is configured to set a geographic location, altitude, horizontal accuracy, course, speed, or other position-related parameters in the host device 124. The setOrientation call is configured to set the host device 124 to act as if in a particular physical orientation such as portrait, portrait upside-down, landscape left, landscape right, face up, face down, and so forth, regardless off actual orientation. The setNetworkCondition call is configured to set the network conditions of the host device 124 such as type of network connected to, receive signal strength, transmit power, and so forth. The multiTouch call is configured to provide inputs which are indicative of one or more touches or other input on a touch sensor of the host device 124. For example, the multiTouch call may simulate a user doing a double tap touch at particular coordinates on the touch sensor. Likewise, the gestures call is configured to provide inputs which are indicative of touch gestures on the touch sensor, such as pinch close, pinch open, and so forth. The Rotation call is configured to input which is indicative of a rotation gesture, as if the host device 124 had been physically rotated along one or more axes. The setDeviceMemory call sets or removes an amount of available memory on the host device 124. The ClickAndSwitchApp call is configured to open an application and provide acceptances or denials for the application. For example, the ClickAndSwitch call may be used to open an application which asks the user for acceptance of terms and provide an acceptance to the application. The switchApp call allows for the switching of an app to the foreground or into focus.

For example, a test script may be implemented to execute an application which searches for stores based on the location of the host device 124, given a location of coordinates of 25.3° South by 131.1° East. The setLocation API call may be invoked to change the location parameter between tests to these coordinates. These tests may be associated with one or more of the test frameworks such as UIAutomation, OCunit, KIF, KIWI, and so forth.

In one implementation at least a portion of the one or more host devices 124 configured to test the application 108 may differ from one another by one or more of: make, model, form factor, input devices, or output devices. In another implementation, at least a portion of the one or more host devices 124 configured to test the application 108 may differ from one another by one or more of: operating system version, installed applications, reported geographic location, apparent network connectivity, or memory usage. For example, the host devices 124 may be configured to report during testing a geographic location which differs from their actual location in a facility housing the host device farm 126.

At block 622, the testing framework 318 is injected into the application 108 at runtime. For example, for unit testing "/Developer/Library/Frameworks/SenTestingKit.framework/" may be used. An ".octest" bundle may be created by a user 102. First, the application 108 may be launched using the debugger. For example, the following sample code may be used to launch the application 108 using the debugger.

Sample Code 2

```
# Launch the app via the debugserver:
/Developer/usr/bin/debugserver-x spring host:7200
/var/mobile/Applications/0D76024E-4744-4149-A3DB-
8E9C4427A81C/Appurify.app/Appurify
# connect to the app remotely using LLDB remotely:
/Applications/Xcode.app/Contents//Developer/usr/bin/
lldb
(lldb) gdb-remote localhost:7001
Process 595 stopped
*thread #1: tid=0x2203, 0x2fee3028 dyld'_dyld_start, stop
reason=signal SIGSTOP
  frame #0: 0x2fee3028 dyld'_dyld_start
dyld'_dyld_start:
->0x2fee3028: mov r8, sp
  0x2fee302c: sub sp, sp, #16
  0x2fee3030: bic sp, sp, #7
  0x2fee3034: ldr r3, [pc, #112]; _dyld_start+132
(lldb) c
Process 595 resuming
```

Sample OCUnit Test Output 1

Test Suite 'All tests' started at 1955-11-05 06:57:58+0000
Test Suite '/var/root/Appurify-tests/AppurifyTests.octest (Tests)' started at 1955-11-05 22:57:58+0000
Test Suite 'AppurifyTests' started at 1955-11-05 22:57:58+0000
Test Case '-[AppurifyTests testExample1]' started.
ple1]' passed (0.000 seconds).
Test Case '-[AppurifyTests testExample2]' started.
Test Case '-[AppurifyTests testExample2]' passed (0.000 seconds).
Test Case '-[AppurifyTests testExample3]' started.
Test Case '-[AppurifyTests testExample3]' passed (0.000 seconds).
leTests' finished at 1955-11-05 22:57:58+0000.
Executed 3 tests, with 0 failures (0 unexpected) in 0.000 (0.001) seconds
Test Suite '/var/root/Appurify-tests/AppurifyTests.octest (Tests)' finished at 1955-11-05 22:57:58+0000.
Failures (0 unexpected) in 0.000 (0.002) seconds
Test Suite 'All tests' finished at 1955-11-05 06:57:58+0000.
Executed 3 tests, with 0 failures (0 unexpected) in 0.000 (0.002) seconds
Test Suite 'All tests' started at 1955-11-05 06:58:49+0000
Test Suite '/var/root/Appurify-tests/AppurifyTests.octest (Tests)' started at 1955-11-05 06:58:49+0000
Test Suite 'AppurifyTests' started at 1955-11-05 06:58:49+0000
Test Case '-[AppurifyTests testExample1]' started.
Test Case '-[AppurifyTests testExample1]' passed (0.000 seconds).
Test Case '-[AppurifyTests testExample2]' started.
Test Case '-[AppurifyTests testExample2]' passed (0.000 seconds).
Test Case '-[AppurifyTests testExample3]' started.
pleTests testExample3]' passed (0.000 seconds).
Test Suite 'AppurifyTests' finished at 1955-11-05 06:58:49+0000.

Executed 3 tests, with 0 failures (0 unexpected) in 0.000 (0.001) seconds
finished at 1955-11-05 06:58:49+0000.
Executed 3 tests, with 0 failures (0 unexpected) in 0.000 (0.001) seconds
Test Suite 'All tests' finished at 1955-11-05 06:58:49+0000.
Executed 3 tests, with 0 failures (0 unexpected) in 0.000 (0.002) seconds Once the application 108 resumes and runs the debugger, the testing framework 318 and the OCUnit framework or portions thereof may be injected into the application 108. For example, the following sample code may be used to inject the testing framework 318 and the OCUnit framework into the application 108:

Sample Code 3

```
var FWK1=†"/Developer/Library/Frameworks/SenTestingKit.framework/†";
  [[NSBundle bundleWithPath:FWK1] load]
  var F=†"/var/root/OC/OCUnitTests.octest/†
  [[NSBundle bundleWithPath:F] load];
```

At block 624, the test server 116 receives information from one or more of the host devices 124 associated with the execution of the tests. This execution may include testing, monitoring, and so forth, configured to generate test results.

At block 626, the test server 116 generates the test results 134 based at least in part on the host device output 320. As described above, the test results 134 may include failure reports for particular sections of the application, screenshots associated with particular tests specified in the test frameworks, logs of each of the host devices 124, user interface information, and any additional files that the test creates. For example, a test in the test framework may have output indicating a failure. The test results 134 may include screenshots associated with the failure, contents of memory at the time of the failure, simulated user inputs leading up to the failure, data being transferred on the network at the time of the failure, and so forth.

At block 628, the test server 116 distributes the test results 134 using the API 120 to the client 104, the build server 106, or both. For example, the test results 134 may be attached to an email for transmission, posted to a URL, served to the client device 104 via a "keepalive" process, or posted to URL associated with the owner of the test server 116.

Figure 7:
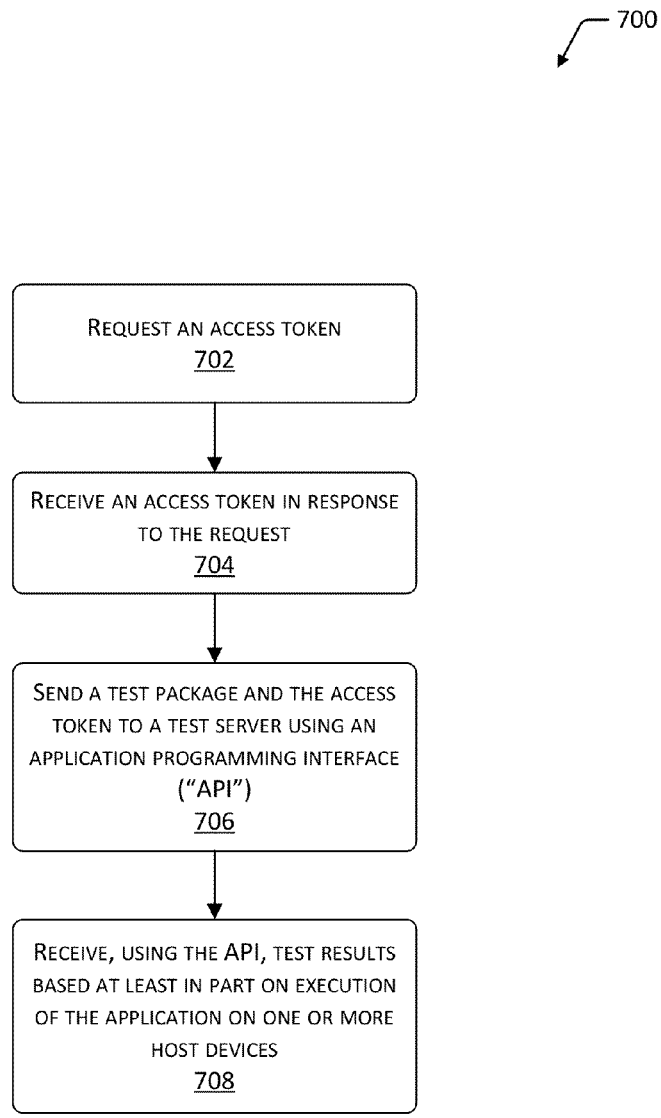
FIG. 7 depicts a flow diagram of a process on a client device to send an application for testing on one or more of the host devices using the API.

FIG. 7 depicts a flow diagram 700 of a process on the client device 104 to send the application 108 for testing using the API on one or more of the host devices 124 in the host device farm 126. For example, the user 102 may be ready to test an application 108 under development using different models of mobile devices using different operating system versions.

At block 702, the client device 104 or the build server 106 communicates with the test server 116 to request an access token that allows the client device 104 or the build server 106 to communicate with the test server 116. The access token may be generated by the test server 116 or a third-party computing device.

At block 704, the client device 104 or build server 106 receives the access token from the test server 116 or third-party computing device. The access token may be submitted with a secure request by the user 102 instead of submitting a username and password. Once a user 102 has an access token, requests can be made on the user's behalf by passing the access token as part of the user's 102 request.

At block 706, a user 102 sends the test package 118 and the access token to a test server using the API 120. The test package 118 may comprise the application 108, the build information 118(1), one or more executable files 118(2), custom tests 118(3), testing configuration data, and so forth. The configuration data may be used to configure one or more of the host devices 124 to enable the application 108 to be tested under various hypothetical network conditions. Such configuration may be manually performed on each of the host devices 124. In some cases, the configuration of the each of the host devices 124 may be through an automated process.

At block 708, the test results 134 are received by client device 104, the build server 106, or both. For example, the test results 134 may be attached to an email for transmission, posted to a URL, served to the client device 104 via a "keepalive" process, or posted to URL associated with the owner of the test server 116. As described above, the test results 134 may include failure reports, screenshots for all of the test frameworks, logs of each of the host devices, user interface information, and any additional files that the test creates. In one implementation, the test results 134 may be based at least in part on a success rate associated with the test package 118.

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and are encoded in a computer-readable storage medium as instructions executable on one or more processors. The sample code included in this disclosure is provided by way of illustration.

Separate instances of these programs can be executed on, or distributed across, separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system comprising:
   at least one processor; and
   at least one memory coupled to the at least one processor and storing instructions configured for execution by the at least one processor, the instructions upon execution by the at least one processor, causing the system to perform a method comprising:
   receive a request for an access token, wherein the access token permits access using an application programming interface ("API"), and wherein the access token corresponds to a set of access rights associated with the API;
   generate the access token associated with the request;
   send the access token;
   receive an application and the access token using the API;
   receive a test package and the access token using the API;
   configure one or more host devices to test the application using a set of configuration data, wherein the set of configuration data is based at least in part on the test package;

send the application to the one or more host devices;
initiate testing of the application on the one or more host devices;
receive from the one or more host devices information associated with the testing of the application;
generate one or more test results based at least in part on the information received from the one or more host devices; and
distribute the one or more test results.

2. The system of claim 1, wherein the set of configuration data comprises a specification of one or more of the following:
a device type associated with a respective one of the host devices;
a memory usage parameter associated with the device type;
a network technology parameter associated with the device type;
an orientation parameter associated with the device, wherein the orientation parameter specifies an orientation of the device relative to an external reference point; or
a geographic location parameter associated with respective one of the host devices.

3. The system of claim 1, wherein the method further comprising signing the application, wherein the signing comprises one or more of the following:
removing, if present, a pre-existing signature from the application;
generating one or more secure hash functions, wherein the one or more secure hash functions are configured to be inserted the application;
providing an entitlement to the application; or
signing the application using the entitlement.

4. The system of claim 1, wherein generating the one or more test results comprises generating one or more failure reports associated with the test package, wherein the one or more failure reports correspond to a respective one of the host devices.

5. The system of claim 4, wherein the method further comprises filtering the test results based at least in part on a success rate associated with the test package.

6. The system of claim 5, wherein the filtering is based at least in part on a device type associated with a respective one of the host devices.

7. The system of claim 1, wherein the distributing the one or more test results comprises:
email at least a portion of the test results to an email address associated with the access token;
post at least a portion of the test results to a first uniform resource locator ("URL") specified by a user of the access token, wherein the URL is maintained on a first server;
send at least a portion of the test results to a device associated with the access token using a keepalive process; or
post at least a portion of the test results to a second URL for a predetermined amount of time, wherein the second URL is maintained on a second server.

8. The system of claim 1, the testing of the application comprises retrieving from at least a portion of the one or more host devices, a plurality of screenshots of a display of the one or more host devices generated as the one or more host devices execute the application.

9. The system of claim 1, wherein the one or more test packages are executed contemporaneously across a plurality of the one or more host devices.

10. A method of testing an application, the method comprising:
requesting an access token at a designated device, the designated device comprising at least one processor, wherein the access token is configured to allow a requesting device to access an application programming interface ("API") associated with a testing server, and wherein the access token corresponds to a set of access rights associated with the API;
receiving the access token at the designated device;
sending the application and the access token from the designated device to the testing server using the API;
sending a test package and the access token associated with the application from the designated device to the testing server using the API;
sending a set of configuration data associated with one or more host devices from the designated device to the testing server; and
receiving one or more test results associated with the test package from the testing server at the designated device, wherein the testing server is configured to use the API to send the one or more test results.

11. The method of claim 10, further comprising dynamically modifying the set of configuration data using the API, wherein the API is invoked between a first test script and a second test script.

12. The method of claim 10, the application comprising executable code configured for execution on the one or more host devices.

13. The method of claim 10, wherein the one or more host devices comprise one or more smartphones, tablet computers, or portable media players.

14. The method of claim 10, further wherein at least a portion of the one or more host devices configured to test the application differ by one or more of: make, model, form factor, input devices, or output devices.

15. The method of claim 10, further wherein at least a portion of the one or more host devices configured to test the application differ from one another by one or more of: operating system version, installed applications, reported geographic location, apparent network connectivity, or memory usage.

16. The method of claim 10, further comprising retrieving, from the one or more host devices, screenshots of a display of a respective one of the host device generated during testing.

17. The method of claim 10, further comprising retrieving, using the API, one or more failure reports associated with the test package, wherein each of the one or more failure reports corresponds to a respective one of the host devices.

18. A method of testing an application comprising:
receiving an access token at a client device, the client device comprising at least one processor, wherein the access token is configured to facilitate interaction with another device using an application programming interface ("API"), and wherein the access token corresponds to a set of access rights associated with the API;
sending the access token and a test package using the API from the client device, wherein the test package comprises:
one or more applications, wherein the one or more applications are configured for testing on one or more host devices;
one or more test cases, wherein the one or more test cases are configured for execution on one or more host devices and utilize one or more testing frameworks;
a set of configuration data associated with the one or more host devices; and receiving a set of test results at the client device, wherein the set of test results is based at least in part on an output received from the one or more host devices.

19. The method of claim 18, wherein the one or more applications are executed using one or more testing frameworks configured to specify a plurality of tests.

20. The method of claim 18, wherein the output received from the one or more host devices comprises a log file and one or more screenshots received from the one or more host devices during testing of the application.

* * * * *